United States Patent [19]

Kishi et al.

[11] Patent Number: 4,546,427
[45] Date of Patent: Oct. 8, 1985

[54] METHOD OF CREATING CURVED SURFACES

[75] Inventors: Hajimu Kishi, Hino; Masaki Seki, Suginami, both of Japan

[73] Assignee: Fanuc Ltd., Tokyo, Japan

[21] Appl. No.: 451,146

[22] PCT Filed: Apr. 5, 1982

[86] PCT No.: PCT/JP82/00105

§ 371 Date: Dec. 1, 1982

§ 102(e) Date: Dec. 1, 1982

[87] PCT Pub. No.: WO82/03475

PCT Pub. Date: Oct. 14, 1982

[30] Foreign Application Priority Data

Apr. 4, 1981 [JP] Japan .................................. 56-050968

[51] Int. Cl.⁴ .................................................. G05B 19/415
[52] U.S. Cl. ...................................... 364/168; 318/570
[58] Field of Search .................. 364/168, 169, 474; 318/570, 573

[56] References Cited

U.S. PATENT DOCUMENTS 3,882,304  5/1975  Walters ................................ 364/169

OTHER PUBLICATIONS

Society of Automotive Engineers 449A, Automotive Engineering Congress Detroit, Mich. (1962-1) (New York) J. B. Rankin [Computers and Numerical Control], p. 4, FIG. 10.

*Primary Examiner*—Jerry Smith
*Assistant Examiner*—Allen MacDonald
*Attorney, Agent, or Firm*—Staas & Halsey

[57] ABSTRACT

A method of creating the curved surface of a three-dimensional curved body, including steps of entering a section curve of the three-dimensional curved body and partitioning information such as the number of partitions and partitioning pitch, partitioning the section curve, successively obtaining a plurality of intermediate section curves so as to contain each of the partitioning points, creating a curved surface on the basis of a plurality of the intermediate section curves and, in the machining operation, transporting a tool along each intermediate section curve. By conducting machining in this fashion, processing can be executed uniformly and machining accuracy improved without requiring that the partitioning axis be changed, even when the curvature of the curved surface varies.

9 Claims, 21 Drawing Figures

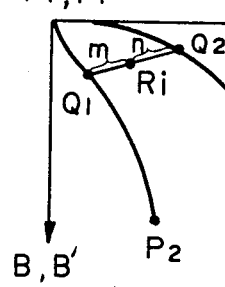

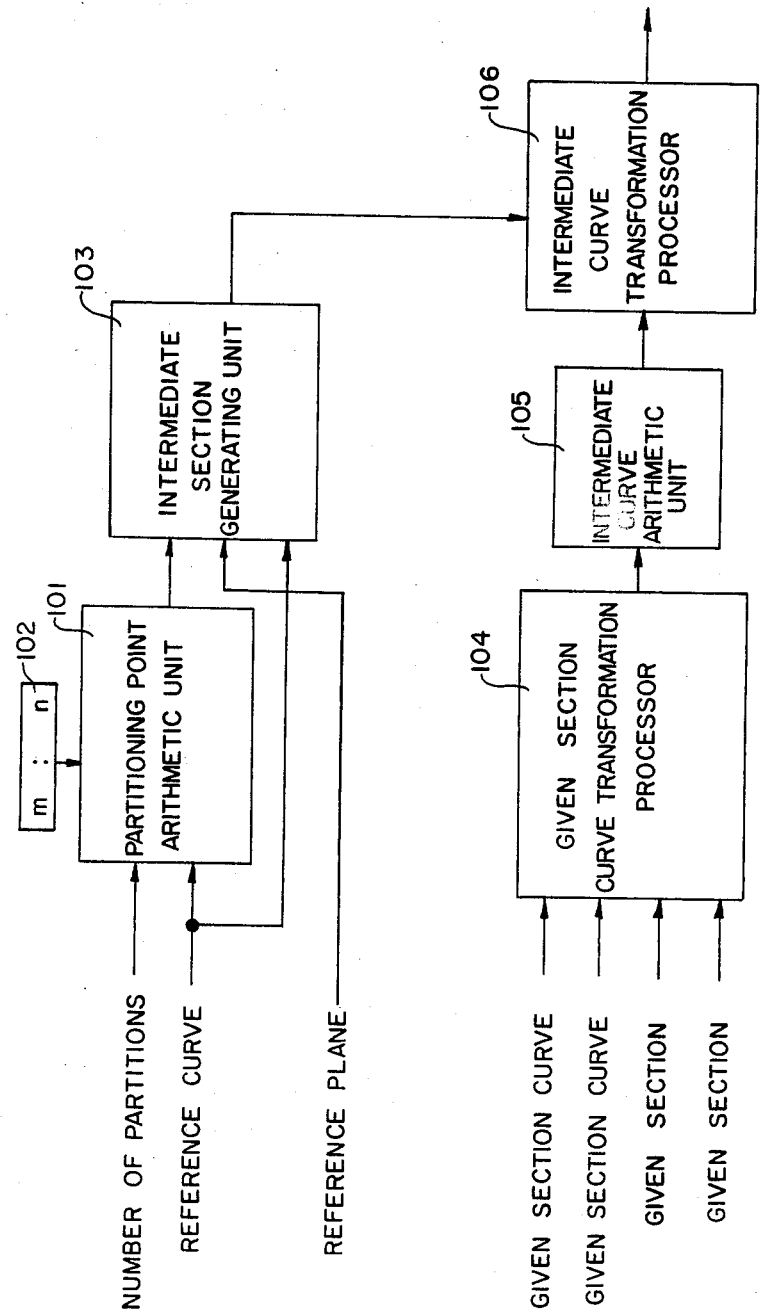

METHOD OF CREATING CURVED SURFACES

BACKGROUND OF THE INVENTION

This invention relates to a method of creating the curved surface of a three-dimensional body and, more particularly, to a method of creating curved surfaces that is ideal for the preparation of a numerical control tape required for the numerically controlled machining of a three-dimensional metal mold or the like.

A curved surface of a three-dimensional metal mold or the like, when drawn out on the plane of a blueprint, is generally represented by a plurality of given section curves, but no data is shown for the shape of the area lying between a certain section curve and the next adjacent section curve. When carrying out numerically controlled machining it is essential that these two section curves be connected smoothly despite the fact that the shape of the area between them is not given. In other words, this means that machining must be performed by generating the curved surface between the two section curves from such data as that indicative of the section curves, punching an NC tape so as to incorporate the data concerning the generated curved surface, and then machining the workpiece in accordance with the instructions on the NC tape. To this end, the numerical control tape ordinarily is prepared by using a computer, and either of two methods can be adopted to create the curved surface, namely (1) a patch system in which processing is executed by partitioning a curved surface into minute portions, and (2) a system in which a two-dimensional curve made of straight line segments and arcs is modified for each pick-feed applied to a third axis.

The patch system (1), however, entails the processing of large quantities of data as well as highly complicated mathematical processing, and requires a large-scale computer system. The system (2) makes processing with a small-scale computer possible, but there is no three-dimensional tool offset capability and an excessive limitation upon tool movement direction and machining shape, making it impossible to create sophisticated three-dimensional bodies.

Accordingly, the inventors have already proposed a method of creating curved surfaces, comprising generating a plurality a intermediate sections and finding a section curve (intermediate section curve) on a curved body, based on the intermediate sections, in accordance with predetermined rules, from section data specifying given sections of a three-dimensional curved body and from data specifying section curves in said sections, and generating the curved surface of the three-dimensional body based on the plurality of generated intermediate section curves. In accordance with such a method, processing can be carried out with a small-scale computer and a sophisticated three-dimensional body can be created in a simple manner.

Heretofore, a three-dimensional curved body has been generated by partitioning the X, Y or Z axis in accordance with a partitioning quantity provided for the X, Y or Z axis irrespective of the position, shape, etc. of the curved surface, generating intermediate sections so as to contain partitioning points obtained from the partitioning operation, finding a section curve (intermediate section curve) in each of the intermediate sections, and generating the three-dimensional curved body on the basis of a plurality of the intermediate section curves. Machining has been performed by transporting a tool along the X, Y or Z axis through a cutting pitch decided in accordance with the partitioning quantity (which operation is referred to as a pick-feed operation), then transporting the tool along an intermediate section curve, followed by repeating the pick-feed operation and the tool movement along an intermediate section curve, whereby the desired three-dimensional curved body is created.

FIG. 1(a) shows an example of the conventional method, including steps of partitioning the Z axis in accordance with a given partitioning quantity, generating a plurality of intermediate sections $S_i$ ($i=1,2 \ldots n$) so as to contain partitioning points $d_i$ ($i=1,2 \ldots n$), finding section curves $C_i$ ($i=1,2,\ldots n$) in the intermediate sections, and performing machining by moving a tool TL along the section curves. FIG. 1(b) shows another example of the conventional method, including steps of partitioning the X axis in accordance with a given partitioning quantity, generating a plurality of intermediate sections $S_i$ ($i=1,2 \ldots n$) so as to contain partitioning points $d_i$ ($i=1,2 \ldots n$), obtaining section curves $C_i$ ($i=1,2,\ldots n$) in the intermediate sections, and performing machining by moving a tool TL along the section curves.

Thus, with the prior-art method, the partitioning pitch quantity can be given without being hampered by the position or shape of the curved surface. However, the conventional method does have the following defects:

(1) When instructing the axis along which the partitioning pitch is to be taken, it is difficult to judge whether the desired curved body of an acceptably small machining error will be obtained. For example, it is general practice to provide for a partitioning quantity along the Z axis [FIG. 1(a)]. However, in a case where the curved surface has a gentle incline along the X axis [FIG. 1(b)], providing the partitioning quantity along the X axis makes it possible to obtain a greater number of partitions so that the curved surface can be generated and machined more accurately.

Accordingly, in a case where the curved surface of the curved body CB of the type shown in FIG. 2(a) is to be generated, it is difficult to judge along which axis the partitioning pitch should be given. [See FIGS. 2(b), (c) and (d).]

(2) Depending upon the shape of the curved surface, the curved surface is partitioned and a desired partitioning axis of desired partitioning pitch must be given for each surface. For example, as shown in FIGS. 3(a) and (b), there are cases where the curvature of the section curve SC of the curved body CB differs depending upon location [at portions (A) and (B)]. In order to obtain a curved surface of uniform smoothness in such cases, the axis along which partitioning is to be performed for the portions (A) and (B) must be changed. As a result, NC data must be created by partitioning the curved surface and generating a curved surface for each surface. This complicates the creation of the curved surface. FIGS. 4(a) and (b) show the machined shape of the curved surface depicted in FIG. 3(a) in a case where the partitioning axis is changed from the Z to the X axis [FIG. 4(a)], and in a case where no change is made [FIG. 4(b)]. When there is no change in the partitioning axis [FIG. 4(b)], machining accuracy declines owing to an increase in unmachined sections at portion (A), as indicated by the shaded portion. On the other hand, when the partitioning axis is changed, the unmachined sections are greatly reduced, thereby enhancing machining accuracy over the foregoing case, as illustrated in FIG. 4(a).

It will be seen, therefore, that in a case where the curvature of a curved surface undergoes a major change, machining accuracy cannot be improved unless the partitioning axis is changed in accordance with the change in curvature. When the partitioning axis is changed, however, processing for the creation of the curved surface becomes more complicated.

Accordingly, an object of the present invention is to provide a curved surface creation method which enables a curved surface to be created and machining accuracy improved without changing the partitioning axis, even in a case where the curvature of the curved surfaces changes.

SUMMARY OF THE INVENTION

The present invention relates to a method of creating the curved surface of a three-dimensional curved body by successively obtaining the external shape curves of the three-dimensional body at a predetermined pitch, and creating the curved surface on the basis of a collection of a plurality of the external shape curves. In such case, the invention includes the steps of entering an external shape curve and partitioning information such as the number of partitions and partitioning pitch or amount of allowable error, partitioning the external shape curve on the basis of the partitioning information, successively obtaining a plurality of intermediate external shape curves so as to contain each of the partitioning points, creating a curved surface on the basis of a plurality of the intermediate section curves and, in a machining operation, transporting a tool along each intermediate external shape curve. By conducting machining in this fashion, it is possible to avoid the troublesome prior-art practice of changing the partitioning axis, even in a case where curvature changes, and to vastly enhance machining accuracy by reducing unmachined portions.

BRIEF DESCRIPTION OF THE DRAWINGS

FIGS. 6(a) to 6(g) are detailed explanatory views of the present invention; FIG. 7 is a block diagram for realizing the method of the present invention.

DESCRIPTION OF THE PREFERRED EMBODIMENTS

Figure 1A:
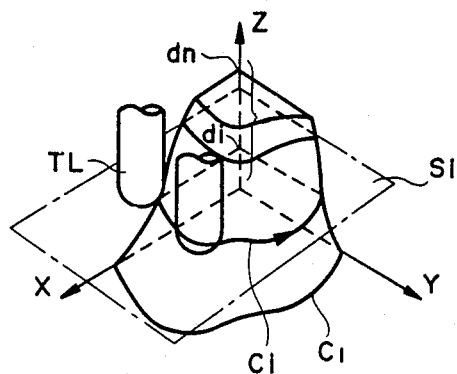
FIGS. 1(a) and 1(b) are explanatory of the conventional method wherein the Z axis or X axis is respectively partitioned to generate intermediate sections and intermediate section curves are found in the intermediate sections.
Figure 1B:
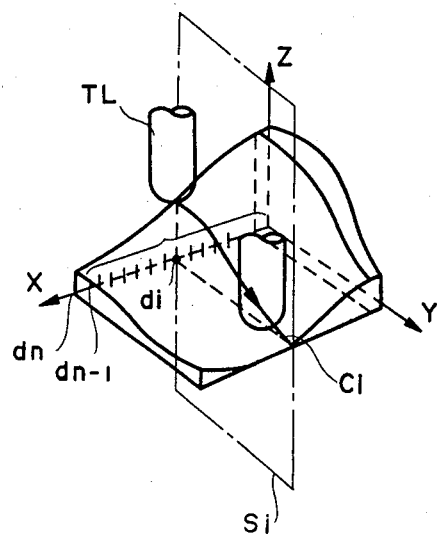
Figure 2A:
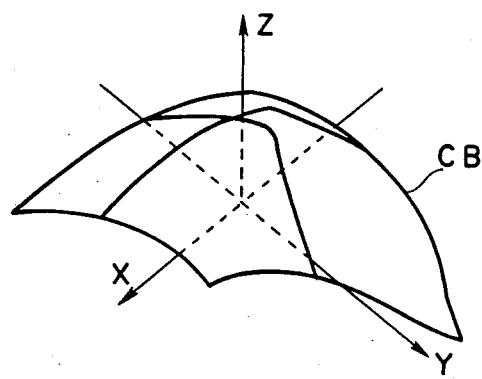
FIGS. 2(a) to 2(d), 3(a) and 3(b), and 4(a) and 4(b) are explanatory views for describing the defects encountered in the prior art.
Figure 2C:
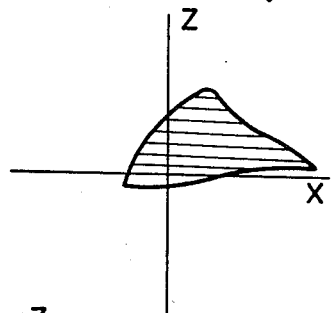
Figure 2B:
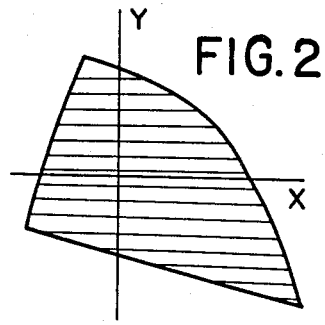
Figure 2D:
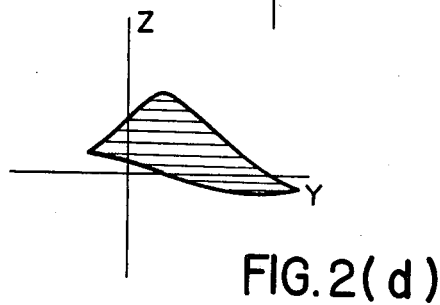
Figure 3A:
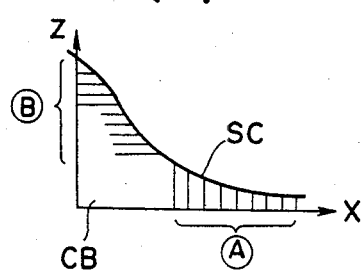
Figure 3B:
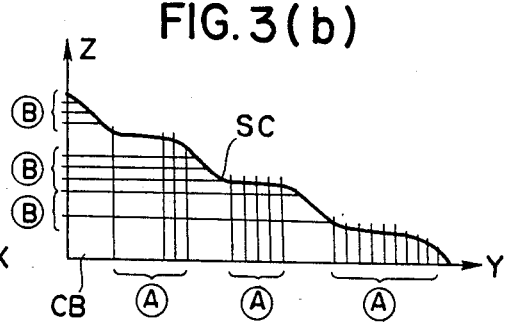
Figure 4A:
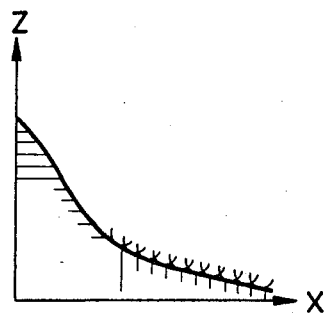
Figure 4B:
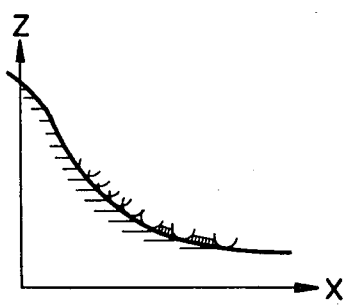
Figure 5A:
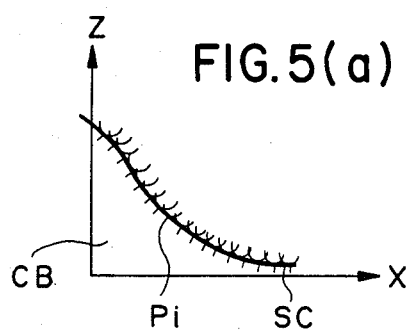
FIGS. 5(a) and (b) are simplified explanatory views of the present invention.
Figure 5B:
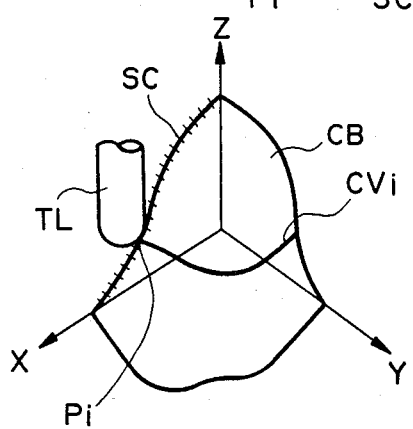

FIGS. 5(a) and (b) are explanatory views for describing the general features of a surface creation method according to the present invention. CB represents a curved body, and SC a section curve (referred to hereinafter as a reference curve) obtained when the curved body is sectioned by the X-Z plane. The section curve has a fundamental shape constituted by straight lines, circular arcs and the like. The section curve SC is one of the external shape curves representing the outward form of a curved body, as is well-known.

In the present invention, information is entered indicative of the section curve SC as well as partitioning information indicating the number of partitions and the partitioning pitch or the amount of allowable error. We will assume hereafter that M is the entered number of partitions. The method proceeds by dividing the section curve SC equally into M-number of segments, finding a plurality of intermediate section curves CVi (i=1, 2 . . . n) successively so as to contain the respective partitioning points Pi (i=1, 2 . . . n), creating a curved surface based on the plurality of intermediate section curves and, when performing machining, moving a tool TL along each of the intermediate section curves CVi. When machining is performed in this manner, complicated operations such as changing the partitioning axis can be avoided, even in a case where the curvature changes as described above. Moreover, unmachined sections are reduced, as illustrated by the shaded portion of FIG. 5(a), enabling machining accuracy to be vastly improved.

FIGS. 6(a) to 6(g) are explanatory views for describing the surface creation method according to the present invention. Reference numerals 11, 12 denote two sections (given sections) of a three-dimensional curved body, and 11a, 12a denote section curves (given section curves) for a case where the three-dimensional curved surface is cut by the given sections 11, 12. Numeral 21 denotes a reference plane containing points P1, P1' on the respective section curves 11a, 12a. Numeral 21a denotes a reference curve lying in the reference plane 21 and specifying the external form of the three-dimensional curved body. Numeral 13 denotes an intermediate section. The intermediate section 13 is generated so as to contain a partitioning point P1" which divides the length of the reference curve 21a into a ratio of m:n, and so as to lie perpendicular to the reference plane 21 and reference curve 21a.

The steps for creating a surface will now be described.

(1) The first step is to enter the data specifying the given sections 11, 12, the given section curves 11a, 12a, the reference plane 21 and the reference curve 21a, as well as the partitioning information. The number of partitions or the partitioning pitch, etc., is entered as the partitioning information.

(2) Next, the coordinates of the partitioning point P1" for partitioning the reference curve 21a into the ratio m:n are found on the basis of the partitioning information entered in step (1). For example, if the number of partitions is M, the coordinates of the partitioning point P1" for partitioning the reference curve 21a into the ratio m:n are found through the following procedure (2-1)–(2-4).

(2-1) The length of each element constituting the reference curve 21a is found (where the term "element" is taken to mean a line segment or an arc constituting the reference curve 21a), and these lengths are added together to find the total length D of the reference curve.

(2-2) D' is evaluated from $$\frac{m}{(m+n)} \cdot D = D'$$

(2-3) An element is extracted containing a point at a distance D' from one end, which point serves as a reference point for partitioning. If $D_1$ is taken as the length of the initial element, $D_2$ as the length of the next element, $D_i$ as the length of the i-th element and so on, the extraction of elements is carried out by finding the k that satisfies the following inequality:

$$\sum_{i=1}^{k-1} D_i \leq D' \leq \sum_{i=1}^{k} D_i \qquad 5$$

(2-4) This step is to find the point on the k-th element whose distance from the starting point thereof is D", where D" is found from:

$$D'' = D' - \sum_{i=1}^{k-1} D_i$$

The obtained point is that which partitions the given curve into the ratio m:n from one end thereof. It will be assumed that, in $$\sum_{i=1}^{k-1} D_i = 0$$

when k=1. Accordingly, if M=m+n, m=i+1 and i is changed in the manner i=0, 1, 2, ... (M−1), then we can find the coordinates of each partitioning point P1" for dividing the reference curve equally into M segments.

Figure 6A:
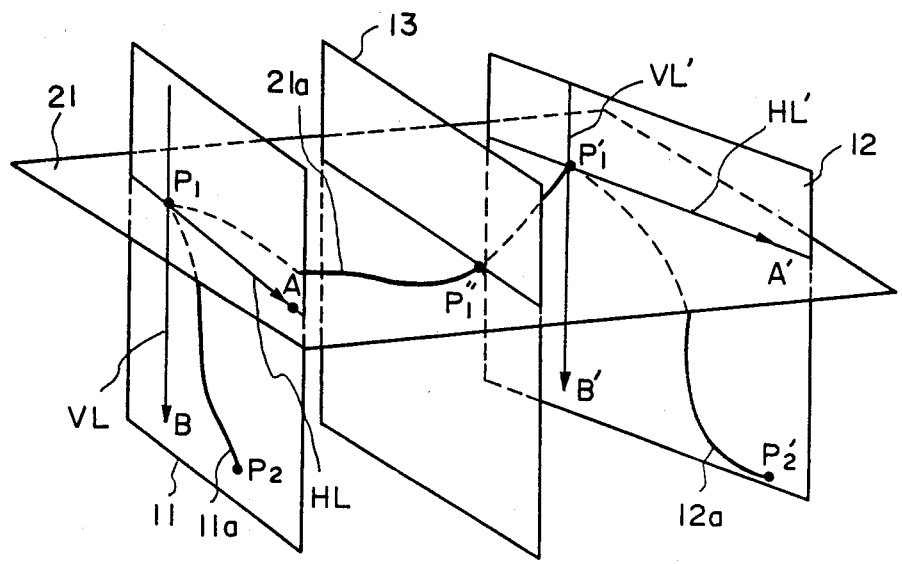
Figure 6B:
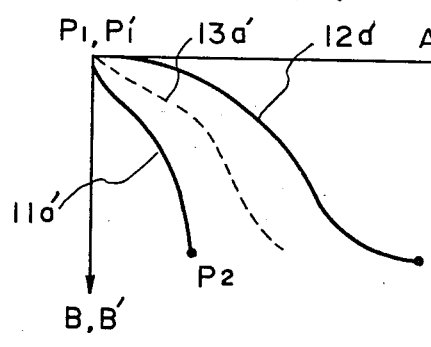

(3) The given section curves 11a, 12a are transformed so as to lie on the same plane [FIG. 6(b)]. It should be noted that the given section curves 11a, 12a can be considered to be curves on the same plane by performing the following operations (3-1) through (3-3).

(3-1) The points of intersection P1, P1' of the reference curve 21a and both given planes 11, 12 are made the same point.

(3-2) Considering lines of intersection HL, HL' of the reference plane 21 and the given planes 11, 12, these lines of intersection HL1, HL2 are divided by the respective points of intersection P1, P1'. Of these divided segments, those that have the same direction with respect to the reference curve 21a are superposed.

(3-3) Considering that straight lines VL, VL', which pass through the points of intersection P1, P1' of the reference curve 21a and the given planes 11, 12 and which at the same time are perpendicular to the reference curve 21a, lie in the given planes 11, 12, it is seen that the lines of intersection VL, VL' are divided by the points of intersection P1, P1', respectively. Of these divided segments, those that have the same direction with respect to the reference curve 21a are superposed.

(4) By using the two given section curves 11a', 12a' lying in the predetermined plane obtained from step (3) above, an intermediate section curve 13a' is generated in said plane.

Figure 6C:
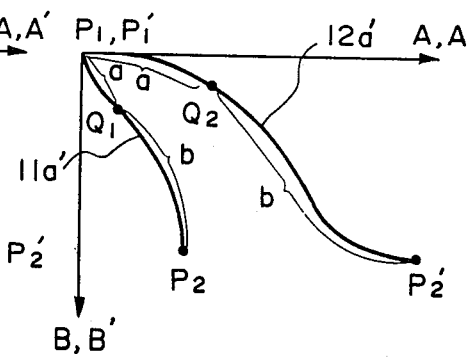

The intermediate section curve 13a is generated through the following procedure:

(4-1) Points Q1, Q2, which partition the lengths of the respective given section curves 11a', 12a' each into a ratio of a:b, are found from the foregoing steps (2-1)–(2-4) [FIG. 6(c)].

(4-2) A partitioning point $R_i$ is computed, which point partitions a straight line connecting the dividing points Q1, Q2 at the partitioning ratio m:n of step 1). [See FIG. 6(d)].

If we let the coordinates of the partitioning points Q1, Q2 be $(x_1, y_1)$ and $(x_2, y_2)$, respectively, then the coordinates $R_i(X, Y)$ of the partitioning point $R_i$ may be calculated from:

$$X = x_1 + \frac{m}{m+n}(x_2 - x_1)$$

$$Y = y_1 + \frac{m}{m+n}(y_2 - y_1)$$

(4-3) The intermediate section curve 13a' is generated by a series of points $R_i$ (i=1,2...) obtained by successively changing the value of the partitioning ratio a/b of step (4-1) from 0 to 1 [FIG. 6(e)]. A smoother intermediate section curve 13a' can be obtained by making the successive changes in the value of a/b very small.

(5) The intermediate section curve 13a' on the predetermined plane found in step (4) is transformed into a curve in the defined spatial intermediate section 13 [FIG. 6(a)]. It should be noted that the transformation into the intermediate section 13 of the predetermined plane obtained in step (3) can be expressed by a combination of a parallel and rotational translation in space. The formula for the transformation generally is expressed by a matrix M. By performing a matrix transformation M for the point $R_i$ (i=1,2,...) found in step (4), the point $R_i$ can be transformed into a point in defined space. The curve obtained by connecting the points in the defined space, found from the matrix transformation, becomes the intermediate section curve 13a in the intermediate section 13.

Figure 8:
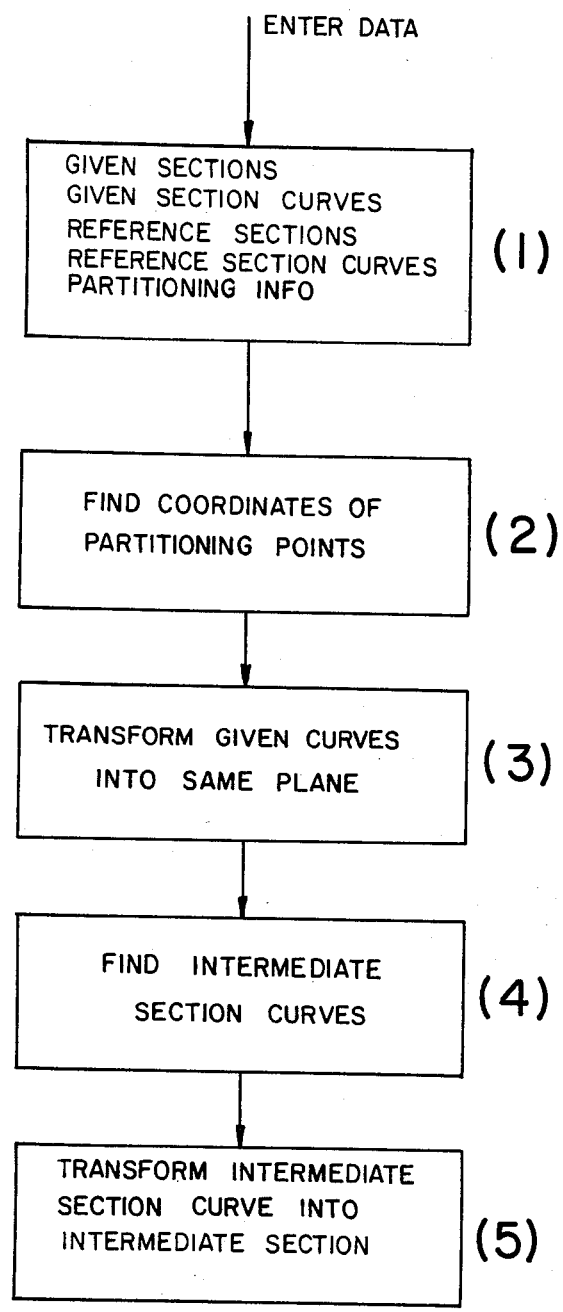
FIG. 8 is a flow diagram of the process of the present invention.

Thereafter, if the operations m=i+1, n=M−n are performed to find the coordinates of the next partitioning point Pi" and steps (2) through (5) are repeated, a curved surface SF [FIG. 6(g)] will be created by assembling the resulting multiplicity of intermediate section curves. The steps above are illustrated in the flow chart of FIG. 8.

In the foregoing, a case was described where two given section curves 11a, 12a and one reference curve 21 are given. Other possibilities are (a) a case where one given section curve and two reference curves are given, and (b) a case where two given section curves and two reference curves are given. In cases (a) and (b), a three-dimensional curved body can be created by partitioning a reference curve, namely a curve representing the external form of the body, in accordance with partitioning information, successively obtaining a plurality of intermediate section curves (curves representing the external form of the body) so as to contain each of the partitioning points, and assembling the intermediate section curves.

FIG. 7 is a block diagram for realizing the surface creation method according to the present invention. In the figure, numeral 101 denotes a partitioning point arithmetic unit for computing the partitioning point P1" upon receiving as inputs the data specifying the reference curve, the number of partitions and the partitioning ratio m:n. Numeral 102 denotes a partitioning ratio storage register 102. Since the operations:

$$i+1 \rightarrow m, M-m \rightarrow n$$

are performed to change the partitioning ratio m:n each time the series of steps (1) through (5) are completed, the content of the register, namely m:n, is updated accordingly. It should be noted that, initially, i=1. Numeral 103 denotes an intermediate section generating unit for computing data indicative of an intermediate section which contains the partitioning point P1" and which is perpendicular to the reference plane and reference curve. Numeral 104 designates a given section curve transformation processor for developing two given section curves into the same predetermined plane and for effecting a transformation into the given section curve data. Numeral 105 denotes an intermediate section curve arithmetic unit, and 106 an intermediate section curve transformation processor. The intermediate section curve arithmetic unit 105 executes the processing for the above-described step (4) for generating the intermediate section curve 13a' [FIG. 6(e)] as a collection of a multiplicity of the points $R_i$ (i=1, 2, ... ). The intermediate section curve transformation processor 106, through a matrix transformation, develops the intermediate section curve 13a' into the intermediate section 13 generated by the intermediate section generating unit 103. The output of the intermediate section curve transformation processor 106 is intermediate section curve data that is stored successively in a memory device, not shown. A three-dimensional curved body is created by collecting a plurality of the intermediate section curves together. It should be noted that while the arrangement of FIG. 7 is shown as being composed of units having a single function, the arrangement can be realized by a computer configuration.

In accordance with the present invention as described above, a reference curve, which is one of the curves defining the outward shape of a three-dimensional curved body, is partitioned based on partitioning information. Therefore, processing can be executed uniformly and machining accuracy improved without requiring that the partitioning axis be changed, even when the curvature of the curved surface varies. Owing to uniform processing, intermediate section curves (curves defining the outward shape of the body) are generated successively and assembled to create the curved body. Processing is simplified as a result.

As described above, processing can be executed uniformly and machining accuracy of a three-dimensional curved body improved without requiring that the partitioning axis be changed, even when the curvature of the three-dimensional curved body varies.

What is claimed is:

1. A method of forming a workpiece to have a curved three dimensional shape, said method comprising
    providing at least three curves representing respective portions of said shape in respective sections, including at least one given section curve in a respective given section and at least one reference curve each in a respective reference section, and partitioning information for partitioning said first reference curve,
    partitioning said first reference curve on the basis of said partitioning information at respective partitioning points,
    determining each of a plurality of intermediate sections and respective intermediate section curves, each said intermediate section curve containing a respective one of the partitioning points, and
    forming said workpiece to have said shape by moving a cutting tool along paths corresponding to said intermediate section curves in the respective intermediate sections.

2. The method of claim 1, comprising
    providing each said section to be a plane,
    providing at least two of said given sections and respective given section curves, and
    utilizing both said given section curves in said respective given sections for finding said plurality of intermediate section curves in the respective intermediate sections.

3. The method of claim 2, wherein said reference section curve has a respective point in common with each of said given section curves.

4. The method of claim 3, comprising each said given section curve intersecting each said reference section at right angles.

5. The method of claim 4, comprising
    said at least one reference curve being perpendicular to each said intermediate section curve at the respective partitioning point in said at least one reference section.

6. The method of claim 1, comprising providing two of said given section curves in respective given sections.

7. The method of claim 1, comprising providing a second reference curve in a respective second reference plane.

8. The method of claim 1, 2, 3, 4, 5, 6 or 7, comprising providing said partitioning points evenly spaced along said at least one respective reference section curve.

9. The method of claim 1, wherein each said given section intersects each said reference section at right angles.

* * * * *